United States Patent [19]
Schwenk

[11] 3,868,969
[45] Mar. 4, 1975

[54] MULTIWAY VALVE

[76] Inventor: Willi Schwenk, Fuchshofstr. 28, Ludwigsburg, Germany

[22] Filed: Mar. 1, 1973

[21] Appl. No.: 336,943

[30] Foreign Application Priority Data
Mar. 1, 1972   Germany.......................... 7207693

[52] U.S. Cl. .......................... 137/625.5, 251/335 A
[51] Int. Cl. ..................... F16k 11/02, F16k 31/165
[58] Field of Search....... 137/625.49, 625.5, 625.64, 137/615.66, 85; 251/335 A; 277/152, 212 F

[56] References Cited
UNITED STATES PATENTS

| | | | |
|---|---|---|---|
| 357,191 | 2/1887 | Fell.............................. | 137/625.66 X |
| 2,244,939 | 6/1941 | Carlson ...................... | 277/212 F X |
| 2,554,622 | 5/1951 | Jones........................... | 277/212 F X |
| 2,702,686 | 2/1955 | Fortune ....................... | 251/335 A |
| 2,741,264 | 4/1956 | Leonard.......................... | 137/625.5 |
| 2,750,961 | 6/1956 | Uritis ............................. | 137/625.5 |
| 2,914,077 | 11/1959 | Grogan......................... | 137/85 X |
| 2,969,045 | 1/1961 | Clar............................. | 137/625.49 X |
| 3,126,915 | 3/1964 | Hunt.............................. | 137/625.5 |
| 3,134,395 | 5/1964 | Glasgow....................... | 137/625.5 X |
| 3,183,933 | 5/1965 | Whitlock et al............. | 137/625.5 X |
| 3,253,516 | 5/1966 | Huntington et al........ | 137/625.66 X |
| 3,384,122 | 5/1968 | Harpman ..................... | 137/625.64 |
| 3,443,814 | 5/1969 | Dahlheimer .................... | 277/152 X |
| 3,540,478 | 11/1970 | Ito................................. | 137/625.5 |
| 3,623,695 | 11/1971 | Hislop......................... | 137/625.66 X |

Primary Examiner—Henry T. Klinksiek

[57] ABSTRACT

A multiway valve has a bore in the housing connected to the outside by passages. Valve seats are located in the bore between the passages. A valve spindle is mounted for movement in the bore and carries seals engageable with the valve seats. The spindle is mounted in pairs of disphragms, some of which are of the snap-action type, at each end with control chambers on the outside of the diaphragms for receiving pressure fluid. The spaces between the diaphragms are vented. Push rods slidable in each end wall of the casing allow manual operation of the outer diaphragms.

1 Claim, 1 Drawing Figure

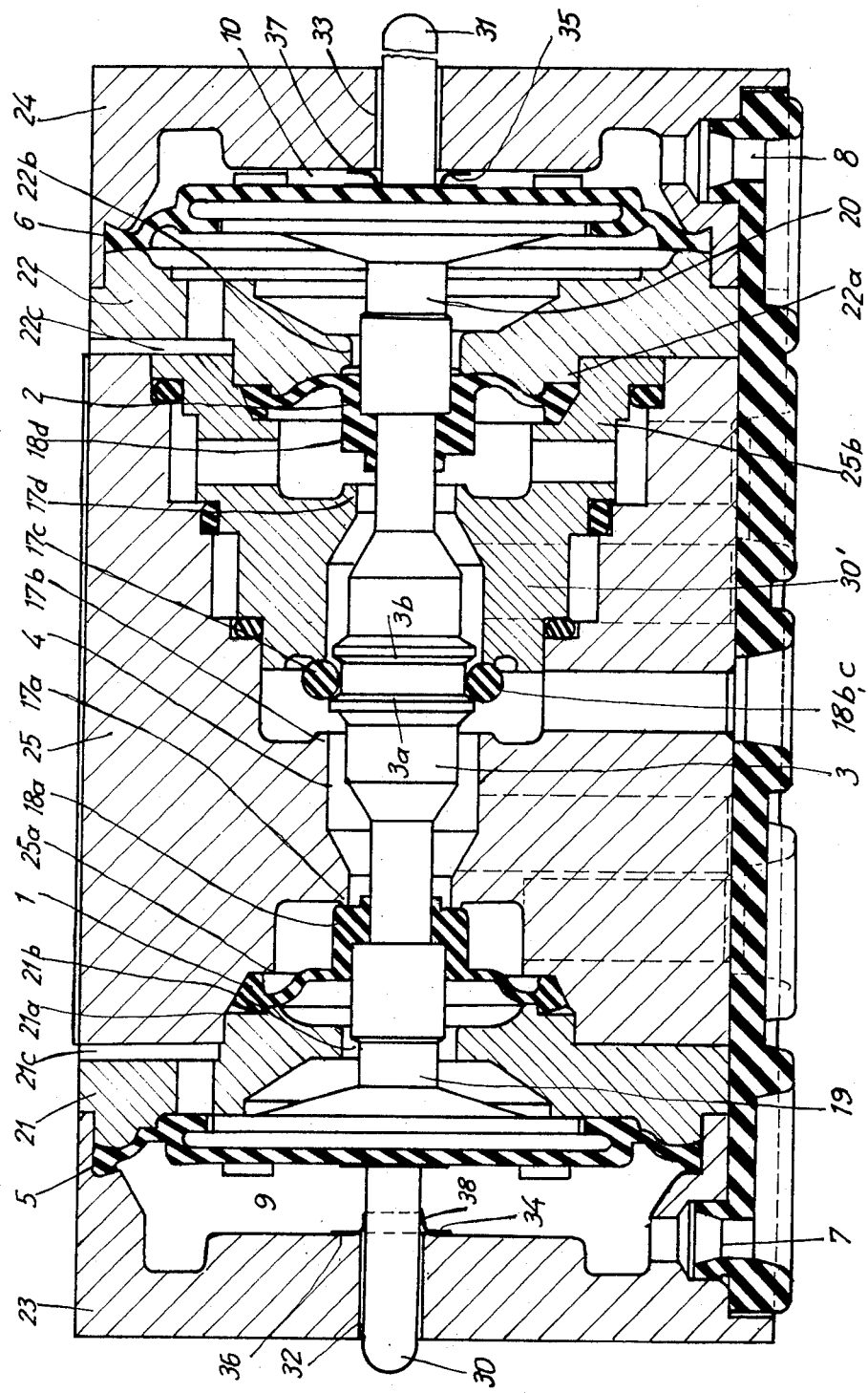

MULTIWAY VALVE

The invention relates to a multiway valve with a closure element axially slidable in the bore of the valve and fitted with a number of annular or disc-shaped packing elements sealing off from each other a number of ports in the valve body for connections supplying pressure oil, user points and appropriate air-venting means.

A valve according to the present invention comprises a valve spindle held floating in the valve bore by axially mounted flaps at each end attached centrally to the valve spindle and peripherally to the valve body and sealing the ends of the said bore, the spindle being thus freely slidable therein without friction. The said valve bore is further provided with ($n - 1$) ports forming the seats for a number of plate or flap valves, providing $n$ different pipe connections, coaxially surrounding the said valve spindle with a sufficient clearance, the said valve seats being, for example, four in number, one whereof is arranged for double-seat action, there also being ($n - 2$) sealing rings or gaskets fitted on the valve spindle, of which one is also arranged for double-beat action. Alternatively there may be ($n - 1$) such gaskets if adapted for single action only. A control membrane is also provided acting on the valve spindle and forming one movable wall of a control chamber communicating with control piping on the side of the membrane remote from the central valve bore and accessible to the pressure of the control fluid, so that the aforesaid closure element can be held in either end position without friction by the spring action of a connected membrane peripherally attached to the valve body and arranged to spring from one end position into the other end position by the influence of the pressure in the control system.

The closure element or valve spindle may be arranged to be manually operable from outside the valve body. For this purpose, a suitable cylindrical or solid pushrod may be provided projecting directly or indirectly from the said valve spindle outside the valve.

The above-described arrangement allows the valve to be actuated either pneumatically (by compressed air) or manually; and also simplifies assembly.

An embodiment of the invention will now be described, by way of example only, with reference to the accompanying drawing which is a cross-section through a multiway valve. The valve has retaining members or membranes 1, 2 axially located on the ends of a spindle 3 for the purpose of floatingly suspending said spindle in a central valve bore 4 in a frictionless manner so that is can freely move to and fro in the said bore. The two membranes are attached peripherally to the valve body and centrally to the valve spindle 3. They further serve to axially seal the said bore 4 at both ends. Other membranes 5, 6 are arranged in series with the retaining membranes 1, 2 at the ends of the valve body 25 for the purpose of actuating and controlling the movement of the valve spindle by the application of a control pressure. These control membranes 5, 6 each form one flexible wall of respective control chambers 9, 10, communicating with respective control pipes 7, 8 at the regions of the membranes remote from the central bore 4, Finally, means are provided for retaining the spindle in both end positions by the elastic effect of a connecting membrane attached peripherally to the valve body and arranged to move from one end position into the other end position with an elastic action when influenced by the pressure of a control fluid. In the arrangement shown, the retaining membranes 1, 2 each fulfil two of the above three purposes: viz, the function of a sealing membrane (closing the central bore 4 axially) and of a spring, quite apart from the fact that they also serve for the frictionless suspension of the spindle. The control membranes 5, 6 fulfil only one of the membrane functions as above: viz., the control function. The arrangement can alternatively be such that one and the same membrane performs all functions, or that a separate membrane is allocated to each of the aforesaid membrane functions. In the arrangement shown both retaining membranes and separate control membranes are fitted axially at both ends of the valve spindle.

The valve is constructed as a five-way valve and the spindle works in conjunction with four plate- or flap-valve seats 17a, 17b, 17c, 17d; while the valve spindle carries three sealing gaskets, 18a, 18b, c and 18d. Thus, the central bore has, for $n$ different paths to be operated by the valve, "$n - 1$" valve seats coaxially enclosing the valve spindle with adequate clearance, and the spindle itself carries "$n - 2$" sealing gaskets, one of which is arranged for double-beat sealing.

As already mentioned, in the arrangement according to the drawing, each retaining membrane is associated with a control membrane also attached peripherally to the valve body or a part connected therewith and which serves to seal the associated retaining membrane and/or the space surrounding it, against the control pressure and to actuate the spindle when influenced by the said control pressure. Conversely, the retaining membranes also serve in any position of the spindle to seal the control membranes from the working pressure in the valve. The control membranes may be firmly connected to the spindle or they can alternatively be unattached and engaged with the spindle only during the switching process. For the latter purpose, the central part of each control membrane on the side facing the spindle carries a cylindrical pushrod 19, 20, coaxial with the spindle, for actuating the latter. If the central part of the control membrane is attached to the spindle, it should advantageously be so arranged that the corresponding end of the spindle is embedded in the membrane or secured thereto in any known manner.

The retaining membranes 1 and 2 are made integral with gaskets 18a and 18d, the resulting unit being shaped as a sleeve formed by the gasket 18a or 18d, extending for some distance along the spindle in the form of a fixed cylinder coaxial with and secured to the said spindle and extending axially incontinuation and integral with a disc forming the actual retaining membrane 1, then extending from the end of the sleeve facing the control membrane 6 or 5, approximately radially outwards and being peripherally attached to the valve body.

Further annular elements or rings 21, 22 are provided for fixing and stretching the membranes. The rings 21 and/ or 22 are each fitted between the corresponding retaining membrane 1 or 2 and the associated control membrane 5 or 6; they are axially immovable in the valve body and are penetrated by the valve spindle.

The control membranes 5 and 6 are stretched between the holding rings 21 or 22 and closing cap 23 and/or 24 on the extreme axial end of the valve body;

the retaining membranes 1, 2 are stretched between reduced parts 21a 22a of the holding rings, which are themselves supported in the central cylindrical part 25 of the valve body, and projecting parts 25a and 25b respectively of the aforesaid central cylindrical barrel 25. The spaces between the membranes 1 and 5 and 2 and 6 respectively are formed with air vents by making the central bores of the rings 21b and 22b of larger diameter than the penetrating parts of the valve spindle, while the ring bodies themselves have radially outward-extending air vents 21c and 22c respectively.

As already mentioned, at least one of the two membranes at each axial end of the valve spindle is so shaped that it moves elastically or with a spring action from one limit position to the other. For this purpose, the radially measured distance from the point on the valve body at which the outer circumference of any one membrane is clamped to the point of attachment of the membrane to the valve spindle is less than the actual distance between the points to be clamped at the outer and inner circumferences of the membrane, so that the membrane is in both end positions inwardly arcuately disposed and, when moved by the action of a pressure pulse, springs abruptly from one end position to the other after passing through a dead-centre position. The gasket 18b, c intended for a double-beat action is in the form of a circlip fitted on a cylindrical part of the valve spindle between two collars 3a, 3b, spaced apart by a distance greater than the width of the gasket so that the latter has some axial play on the spindle. This circlip can, however, alternatively be fitted on a cylindrical part of the valve spindle axially fixed between two collars.

The closure element or valve spindle 3 is, in the embodiment shown in the drawing, made as a stepped, longitudinally extending cylindrical rod, the two ends and the middle part thereof which carry the double-acting sealing ring or gasket being of larger diameter than the intermediate parts. The valve spindle is housed in the central bore 4 in the barrel 25 of the valve. In the embodiment shown in the drawing, this spindle has seven steps whereby looking from one end axially towards the other, it firstly undergoes a construction in the region at which the bore carries two of the four plate-valve seats, followed by a gradually tapering extension. This bore and also the spindle can of course be shaped differently from the above example; this will depend entirely on the particular intended purpose of the valve as well as considerations of convenient assembly. To facilitate assembly, the expanded part of the middle region of the valve body contains a plug element or insert 30' with a generally similar taper, having a central bore penetrated by the spindle whereby the two remaining valve seats coacting with the double-acting closure element are provided, one seat in the middle part of the valve body and the other in the insert. This plug insert has on its outer circumference a number of similar steps individually corresponding with the steps in the central bore of the middle part of the valve body, sealing means, for example rubber gasket rings or the like, being inserted between the matching step faces. This plug insert further has a number of radial passages extending from the central bore in the valve body towards further pipe connections in the middle part of the valve body, leading to further connecting pipes and air vents. This plug insert substantially aids easy assembly of the valve componente and assists in overcoming manufacturing difficulties which might otherwise arise.

The valve is arranged to be operated from the outside of the valve body and manually controlled. For this purpose, the valve spindle is associated at each end with axially extending pushrods 30, 31, each protruding at one end from the valve body and attached at the other end to the side of the associated control membrane remote from the valve spindle, being either vulcanished in place on the said membrane or riveted thereto. The length of the actuating pushrods 30, 31 is so selected that in the one end position of the valve spindle (as seen at the left hand end of the valve in the drawing) the pushrods just project beyond the bores 32, 33 in which they are housed, while in the other end position (as seen at the right-hand end of the valve in the drawing), they project appreciably beyond the corresponding end face 23, 24 of the valve body. The two actuating pushrods are coaxial with each other and with the valve spindle or closing element; they may be cylindrical or solid and their free ends are slightly rounded. The pushrods pass through the end walls 23, 24 of the valve body in stuffing boxes. For this purpose, the passage through the wall is equipped with a gasket ring of a cross-section resembling that of a sealing lip 34, 35, surrounding the opening, attached to one side of such end wall of the valve body at 36, 37 and bearing circumferentially on the pushrod at 38. However, the arrangement can alternatively be such that the through bore 32, 33 in the end face of the valve body housing the actuating pushrod, is fitted with a bush of sealing material (not shown in the drawing) by which the pushrod is guide. In this manner, it is possible to operate the valve either by pneumatic (compressed air) pulses or manually, if so required for some particular reason. The arrangement is so contrived that the means for manual operation do not affect the action of the means for operating by a pressure fluid.

What I claim is:

1. A multiway valve comprising a housing having a bore therein, a plurality of passages connected to the bore and to the outside of the housing, and a plurality of valve seats located between the openings of the passages into the bore, a valve member comprising an elongated spindle, means mounting said spindle for movement within the bore longitudinally thereof, said spindle having a plurality of seal means in the form of annular members each having a sealing surface engagable with each of the valve seats spaced therealong, said mounting means including means mounting the spindle to float in the bore out of frictional contact with the walls thereof and including support diaphragms adjacent each end of the spindle having their outer edges secured to the housing and supporting the spindle and closing the ends of the bore, control diaphragms spaced from and on the sides of the support diaphragms away from the bore, central pushrods carried by the control diaphragms coaxial with the spindle for actuating it, said end walls and said support diaphragms between them forming chambers at each end of the housing, and means to conduct pressure fluid to such chambers, said valve having $n$ paths therethrough with "$n-1$" valve seats and "$n-2$" seal means, one of the diaphragms at each end of the casing being of the snap-action type, said housing having openings therein in the end walls facing said control diaphragms, actuating push rods slidable in said openings and extending outwardly of the end walls secured to the control diaphragms for manual movement thereof, and means for venting fluid from the spaces between the support diaphragms and the control diaphragms.

* * * * *